June 3, 1930. W. GEBHARDT 1,761,822
FEEDING MECHANISM FOR NUT CRACKING MACHINES
Filed April 11, 1928 2 Sheets-Sheet 1
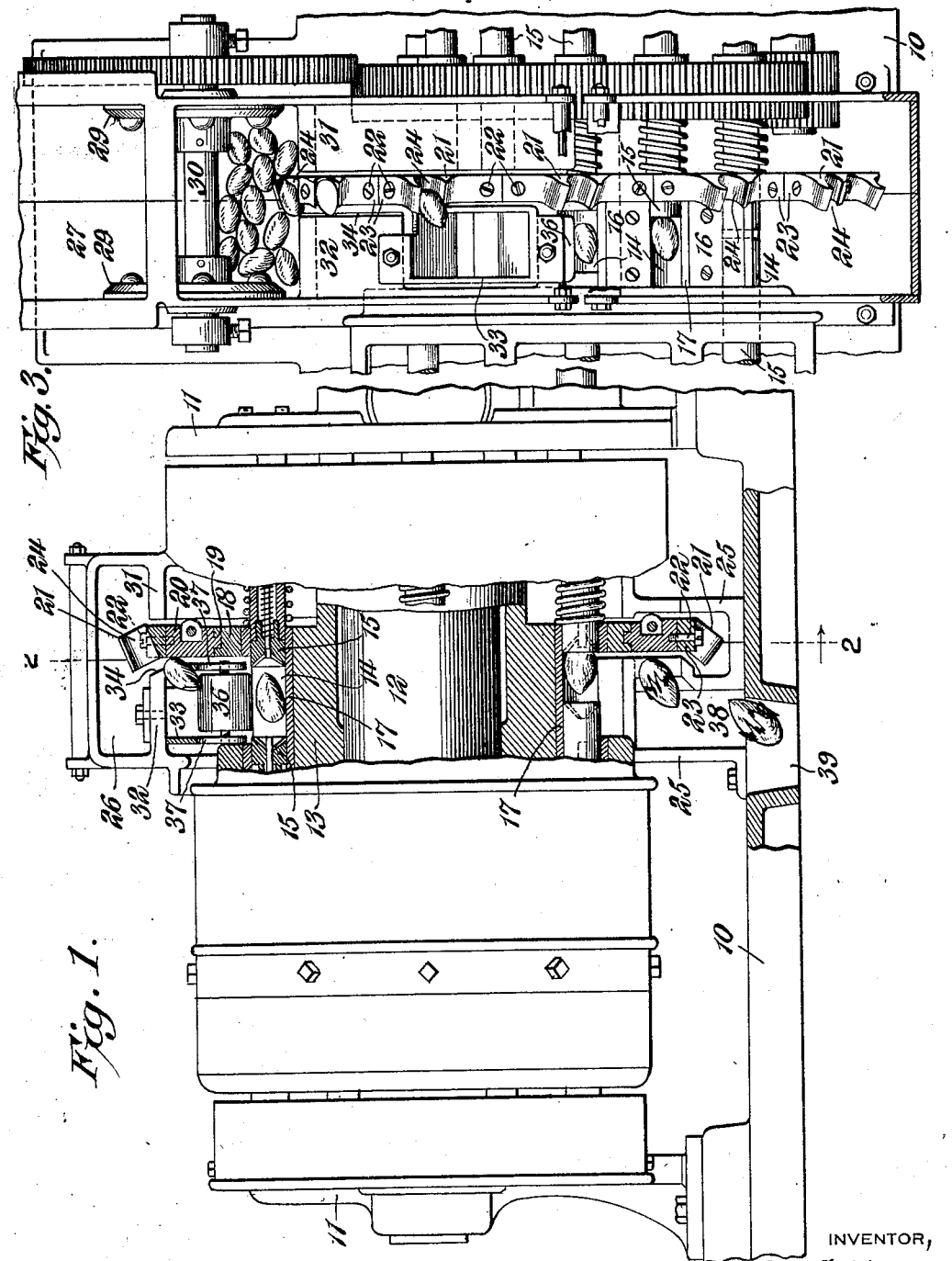
INVENTOR,
William Gebhardt,
BY Siggers & Adams,
ATTORNEYS

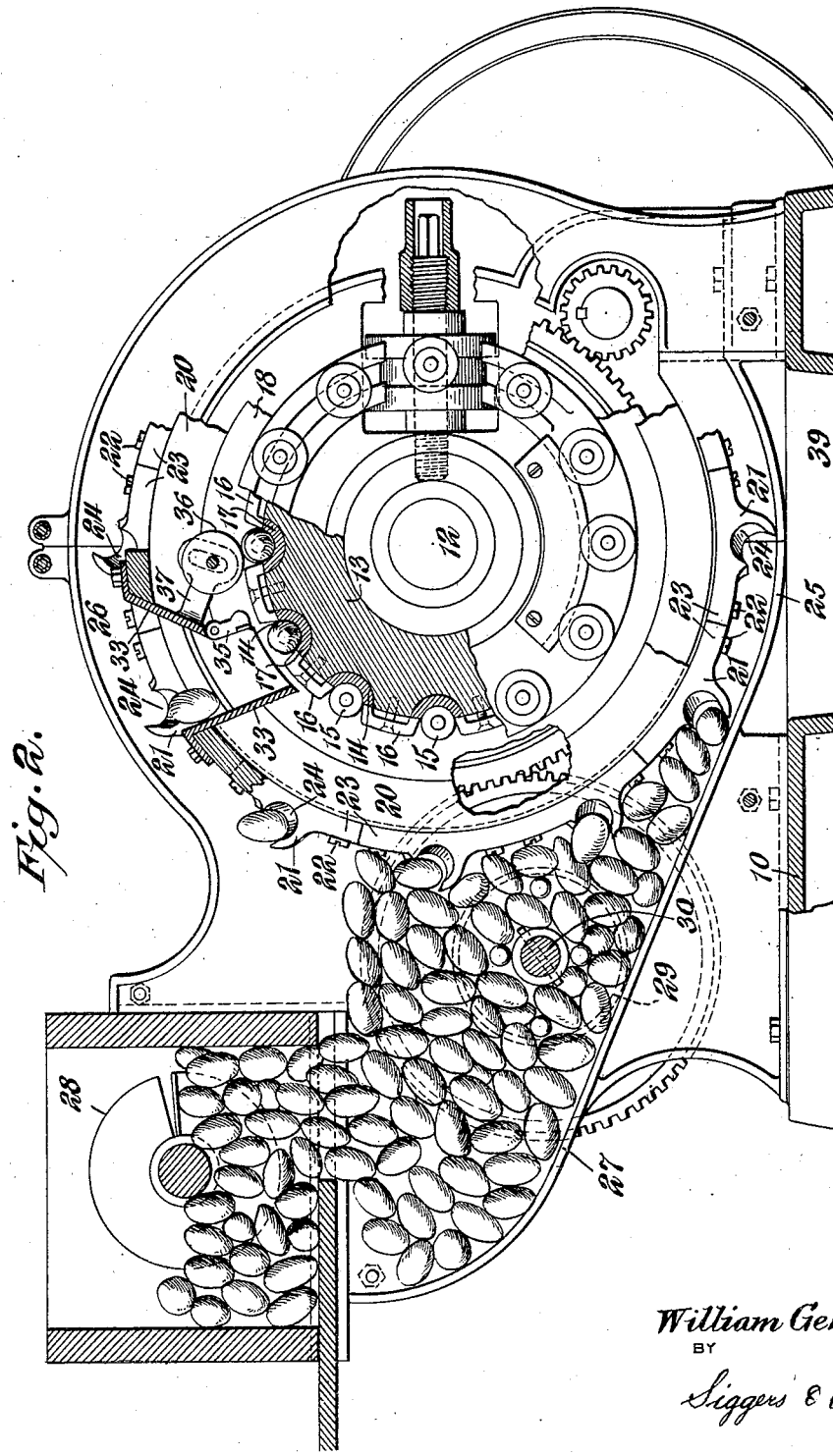

Patented June 3, 1930

1,761,822

UNITED STATES PATENT OFFICE

WILLIAM GEBHARDT, OF SAN ANTONIO, TEXAS, ASSIGNOR TO G. A. DUERLER MANUFACTURING COMPANY, OF SAN ANTONIO, TEXAS, A CORPORATION OF TEXAS

FEEDING MECHANISM FOR NUT-CRACKING MACHINES

Application filed April 11, 1928. Serial No. 269,174.

This invention relates to nut cracking machines and, among other objects, aims to provide improved high speed nut feeding mechanism adapted to supply a single nut at a time to a rotating drum and means to insure perfect "lay-downs" of the nuts in their respective pockets ready to be gripped properly by the cracking mechanism.

In the accompanying drawings,

Fig. 1 is a side elevation, partly in section of a nut cracking machine embodying the invention;

Fig. 2 is a sectional view taken on the line 2—2 of Fig. 1, parts being shown in elevation; and Fig. 3 is a top plan view of the nut feeding mechanism shown in Fig. 1.

Referring particularly to the drawings the improved feeding mechanism is shown as being applied to a machine of the same general type, as that described in my prior Patent No. 1,133,121, dated March 23, 1915. That is to say, the machine is of the rotary carrier or drum type wherein a plurality of plungers operate in nut receiving pockets, first to grip the nuts and then, to crack them by the usual cam operating means.

Herein, there is shown a base 10 having end plates or supports 11 carrying a fixed shaft 12 on which is mounted a rotary carrier or drum 13 (Fig. 1) having the usual nut receiving pockets 14 in its periphery in which the plungers 15 are adapted to be reciprocated by operating mechanism of any approved design. These features may be similar to those shown in my prior patent and, hence, require no further description. However, the spaces between the pockets in the drum, here shown, are preferably bridged by inverted substantially U-shaped bridge members 16 secured to the drum and having their opposite edges clamped against the edges of the pocket bushings 17, these bridges being so arranged that nuts fall on them before they enter their respective pockets.

Referring to Fig. 1 the drum 13 is shown as having an integral annular flange 18 at one end adjacent to the nut pockets and this flange preferably has a peripheral groove 19 to receive a sectional annular rim or flange constituting a pick-up wheel 20, each section having a tongue fitting in the groove, the arrangement being such that this sectional rim may be advanced or retarded in order that the nuts may fall on the bridges at the proper time to insure that they will drop in the receiving pockets. The pick-up devices on the rim are shown as comprising crescent-shaped spoons 21 secured thereto by means of screws 22 passing through abutting arcuate flanges 23. These pick-up spoons have a highly polished inclined pocket 24 out of which the nuts are adapted to slide without material frictional resistance and fall on the bridge pieces 16 of the drum at the proper time. The idea of detachably securing the spoons to the feed wheel is to permit spoons of different sizes for different grades or sizes of nuts to be used on the same machine. Moreover, the spoons are often damaged so that they do not function properly and this arrangement permits them to be replaced.

Referring to Fig. 1, there is shown a sectional casing 25 having its parts bolted together about the drum and providing an annular space 26 in which the feed wheel rotates. On one side of the drum, the casing walls are shown as being extended to provide a nut hopper having an inclined bottom wall 27, (Fig. 2) the arrangement being such as to supply nuts to the pick-up spoons as the feed wheel rotates. The nuts may be supplied to and kept at a constant level in the hopper by a screw conveyor 28 and are preferably agitated to prevent the formation of voids by means of a pair of disks 29 arranged on a driven shaft 30 and having knob-like projections to engage the nuts.

Referring now to Figs. 1 and 3, the casing 25 is shown as having integral flanges 31 and 32 on opposite sides of the feed wheel adjacent to the spoons 21 and the flange 32 is provided with an opening in which a nut feed chute 33 is detachably secured. The inner edge of this flange is beveled at 34 between the bottom of the hopper and the mouth of the chute to provide a fixed supporting abutment for the ends of the nuts carried in the pick-up spoons. The arrangement is such that all surplus nuts forced by the spoons above the nut level in the hopper will fall back on either side of the feed wheel and roll down the outside of the two flanges 31 and 32 (Fig. 3). This is very important because it is essential to avoid feeding "doubles" to the drum pockets. Also, the "singles" carried to the mouth of the chute 33 will always fall endwise into it, immediately after the lower open ends of the spoons pass the inner edge of the chute wall.

To insure that the nuts will lie perfectly in the pockets 14, ready to be gripped endwise by the plungers, the rear wall of the chute is shown as having a pivoted and weighted trap gate or flap 35 so arranged that any nuts which may be standing on end in their pockets will strike its lower edge when they pass under it and will be pushed down so that they will lie properly in the pockets. The flap or gate will swing by gravity to the position shown in Fig. 2 after the nuts strike it. Also, in Fig. 2, there is shown a loosely journaled roller 36 mounted betweeen arms 37 projecting rearwardly from the rear wall of the chute and being so arranged that the nuts in the pockets will roll under it and be pressed against their seats just before they are gripped by the plungers. The roller is free to roll over the bridge pieces and fall on the nuts below them in the pockets. The nuts roll under it and are pressed against their seats, thus stopping any rocking motion which oval shaped pecans are likely to have before they are gripped between the jaws. It will be understood that the nuts will be cracked by the plungers during the rotation of the machine and will be ejected from their pockets at some suitable point. Herein, the sectional casing 25 has a discharge chute 38 leading to an opening 39 in the base 10 of the machine.

From the foregoing description, it will be understood that the improved feed mechanism is particularly adapted for use on high speed machines; that the pick-up spoons can be made and replaced very cheaply; that the feed wheel may easily be adjusted and timed so that the nuts are dropped into the chute onto the bridges to lodge in their pockets; that the rim may be replaced by substituting a rim having different sized spoons on it to crack nuts of a different grade or size; and that the spoons may be changed to accommodate nuts of different sizes. Moreover, the arrangement is such as to insure that there will be no "missers" because the spoons are caused to pass through a pick-up zone in the hopper wherein the nuts are always free of large voids. Further, it will not feed "doubles" to the drum and thereby avoids producing imperfectly cracked nuts. Also, the nuts always fall at the proper time, into the feed chute out of the polished spoon seats.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In combination with a nut cracking machine of the rotary drum type, a chute to deliver nuts to the drum; a rotatable nut feeder adjustably secured to said drum and having a plurality of detachable pick-up devices each adapted to deliver one nut at a time to said chute in proper timed relation to fall into a socket in the drum; and a hopper having agitating means to supply nuts to said feeder.

2. In combination with a nut cracking machine of the rotary type, a chute to deliver nuts to the drum; a rotatable nut feeder associated with said drum including an annular flange member detachably connected to the drum; a plurality of pick-up spoons detachably connected to the flange member adapted to pick up one nut at a time to be dropped into said chute; and a feed hopper to supply nuts to said feeder.

3. In a nut cracking machine of the character described, a nut delivering chute to deliver nuts to the cracking mechanism; a rotary feeder fixed on the drum adjacent to the chute and having a plurality of detachable pick-up members secured thereto; a feed hopper through which the pick-up members rotate; and flange members on opposite sides of the feeder over which the surplus nuts fall back into the hopper.

4. In a nut cracking machine of the character described, a nut delivering chute to deliver nuts to the cracking mechanism; a rotary feeder adjacent to the chute and having a plurality of detachable pick-up members secured thereto; a feed hopper through which the pick-up members rotate; and an arcuate flange member adjacent to the feeder between the chute and the hopper arranged to support one end of each nut in the pick-up members and presenting a surface over which surplus nuts fall back into the hopper.

5. In a nut cracking machine of the rotary drum type, a nut delivering chute to deliver nuts to the cracking mechanism; a rotary feeder on the drum adjacent to the chute and having a plurality of detachable pick-up members secured thereto; a feed hopper through which the pick-up members rotate; and a casing about said feeder having annular flange members on opposite sides of the feeder, one of said flanges on that side adjacent to the chute presenting a bevelled edge against which the ends of the nuts are supported in the pick-up members and both of the flanges providing outer surfaces over which surplus nuts fall back into the hopper.

6. In combination with a rotary drum nut cracking machine, a feeder comprising an annular rim connected to the drum; and a plurality of pick-up spoons detachably connected to the rim and having inclined polished surfaces over which the nuts are adapted to slide.

7. In combination with a rotary drum nut cracking machine, a feeder comprising a sectional annular rim removably connected to the drum; and a plurality of pick-up spoons detachably connected to the rim and having inclined polished surfaces over which the nuts are adapted to slide.

8. In combination with a nut cracking machine of the rotary drum type, a feeder comprising a sectional annular rim presenting means interlocking with the drum and detachably connected thereto; and a plurality of pick-up spoons detachably secured to the periphery of said rim.

9. In combination with a nut cracking machine of the character described, a rotary feed wheel having pick-up, crescent-shaped spoons detachably secured to the periphery thereof; and means on the machine cooperating with the spoons to support the nuts in proper feeding positions and to prevent "doubles" from being conveyed to the machine in a single spoon.

10. In combination with a rotary nut feeder, a nut hopper through which the feeder rotates; a nut supplying conveyor extending into the hopper and arranged to supply nuts thereto and maintain them at a substantially constant level therein; and an agitator within the hopper adjacent to the feeder to eliminate voids within this mass of nuts.

11. In combination with a nut cracking machine having a rotary drum and nut receiving pockets therein, a chute to deliver nuts to the drum; feeding means to deliver nuts to the chute; bridges on the drum between the pockets on which the nuts are adapted to fall; and means associated with the chute to strike the nuts and cause them to lie properly in the pockets.

12. In combination with a nut cracking machine having a rotary drum and nut receiving pockets therein, a chute to deliver nuts to the drum; feeding means to deliver nuts to the chute; bridges on the drum between the pockets on which the nuts are adapted to fall; a pivoted gate on the chute arranged to strike any nuts standing on their ends and cause them to lie properly in the drum pockets; and a loosely journaled roller adjacent to the pivoted gate arranged to press the nuts into the bottom of the pockets.

13. In combination with a rotary drum nut cracking machine, a chute to deliver the nuts to the drum pockets and means associated with one wall of the chute to engage the nuts carried by the drum and cause them to lie perfectly in the drum pockets whereby they will be engaged by the nut cracking mechanism.

14. In combination with a rotary nut cracking machine, a rotary feeder; a hopper to supply nuts to the rotary feeder; and a casing for the feeder integrally connected to the walls of the hopper.

15. In combination with a rotary nut cracking machine, a rotary feeder; and a sectional casing enclosing the feeder having extended walls forming the hopper.

In testimony, that I claim the foregoing as my own, I have hereto affixed my signature.

WILLIAM GEBHARDT.